United States Patent [19]
Martin et al.

[11] Patent Number: 5,528,939
[45] Date of Patent: Jun. 25, 1996

[54] MICROMECHANICAL PRESSURE GAUGE HAVING EXTENDED SENSOR RANGE

[76] Inventors: Jacob H. Martin, 6 Fuller Brook Rd., Wellesley, Mass. 02181; William P. Kelley, 37 Wellman St., #3, Beverly, Mass. 01915

[21] Appl. No.: 407,840

[22] Filed: Mar. 21, 1995

[51] Int. Cl.$^6$ ................................................. G01L 11/00
[52] U.S. Cl. ..................... 73/702; 73/703; 73/704
[58] Field of Search ............................. 73/702, 703, 704

[56] References Cited

U.S. PATENT DOCUMENTS

| | | | |
|---|---|---|---|
| 4,342,230 | 8/1982 | Okamura et al. | 73/702 |
| 4,479,070 | 10/1984 | Frische et al. | 73/703 |
| 4,644,804 | 2/1987 | Ramm et al. | 73/702 |
| 4,747,311 | 5/1988 | Hojoh | 73/702 |
| 4,813,271 | 3/1989 | Greenwood | 73/702 |
| 4,995,263 | 2/1991 | Stocker | 73/702 |
| 4,995,264 | 2/1991 | Stocker et al. | 73/702 |
| 5,060,526 | 10/1991 | Barth et al. | 73/702 |
| 5,136,885 | 8/1992 | Lieberman et al. | 73/702 |
| 5,142,912 | 9/1992 | Frische | 73/702 |
| 5,228,344 | 7/1993 | Hojoh | 73/702 |

*Primary Examiner*—Richard Chilcot
*Assistant Examiner*—Max Noori
*Attorney, Agent, or Firm*—David J. Power; Bella Fishman

[57] ABSTRACT

An improved gas pressure gauge is disclosed that extends the linear range of pressure dependent damping to higher pressures by placing a stationary member in very close proximity to the vibrating member. This range of linear dependent damping is also extended to lower pressures by making the vibrating member large in area relative to its small distance from a fixed planar member, which can also serve as its supporting member, by making it vibrate in a direction perpendicular to the fixed planar member, and by making the springs that support the vibrating member from a high Q and conductive material, such as boron doped single crystal silicon. These features for extending the range to higher and lower pressures can be built separately into two independent vibrating elements that can be used individually or in tandem, or they can be built into a single vibrating element that can be made to vibrate in two modes, one parallel and one perpendicular to a fixed member. The preferred method of measuring gas pressure with these gauges is to determine the drive voltage necessary to drive the mechanical oscillator to a fixed amplitude against the pressure dependent damping of the gas that is being measured.

34 Claims, 7 Drawing Sheets

MICROMECHANICAL PRESSURE GAUGE HAVING EXTENDED SENSOR RANGE

FIELD OF THE INVENTION

This invention relates to an improved molecular drag type pressure gauge, and in particular to a molecular drag type gauge having an extended pressure range measurement capability.

BACKGROUND OF THE INVENTION

Pressure measurement in vacuum systems is particularly challenging because of the enormous range of pressures that can be realized. Typical vacuum systems have two or more types of gauges, each with its particular range of usefulness. The need to switch between different vacuum gauges is tiresome and produces reading discontinuities where the gauge ranges meet. Gauges with broad pressure ranges are attractive because they can reduce the number of different types of gauges needed to monitor a particular vacuum system.

One class of pressure gauges, known as molecular drag gauges, makes use of the phenomenon that at low pressures the drag forces produced by a gas on an object moving through it are proportional to the pressure of the gas.

One type of gauge employing this principle uses a freely swinging fiber or vane as a means of measuring pressures in the range of $10^{-3}$ Torr to $10^{-5}$ Torr. The fiber or vane pendulum is started swinging mechanically, for example by mechanically shaking the vacuum container. The damping is due mainly to the gas in the container. The time for the pendulum to damp to one half its original amplitude, or half-life, is measured. The relationships between damping and pressure and damping and half-life can be used to determine the pressure as a function of half-life. This method of measuring pressure, however, is quite limited in range. It is also cumbersome and takes on the order of one hour to make a measurement at low pressure.

Another type of gauge employing this principle uses a tuning fork made from piezoelectric material as the sensing element. The tuning fork is made to oscillate and its resonance resistance is directly proportional to gas pressure when the pressure is low enough to be in the molecular flow region. When the pressure rises to a level where the flow begins to become viscous, the resonance resistance continues to increase with pressure, but at a much reduced rate. To make a pressure measurement using the tuning fork oscillator, the tuning fork is placed where the pressure is to be measured and caused to oscillate by means of an oscillator circuit. The pressure is determined by measuring the difference between the resonant resistance where the pressure is being measured and the natural resonance resistance of the tuning fork. One of the drawbacks of this device is that its range is limited at the low end when the resistance caused by the gas is of the same order as the natural resonance resistance of the tuning fork. The sensitivity is also limited at the high end by the shift from molecular resistance to the transition between molecular and viscous resistance.

Yet another type of pressure gauge that makes use of the drag forces of a gas is called a spinning rotor gauge. This gauge measures the deceleration of a magnetically levitated spinning metal sphere inside a stainless steel chamber that is, in turn, immersed in the gas that is to have its pressure measured. The ball is electromagnetically spun up to a target rotation rate and then allowed to decelerate. The rate of the ball's deceleration is proportional to the number of gas molecules that come in contact with the ball per unit time which is, in turn, proportional to gas pressure. This gauge can measure pressures in the range of $10^{-2}$ Torr to $5 \times 10^{-7}$ Torr. Spinning ball gauges are very accurate, however their use, is restricted by their size, high cost and limited range of measurement capability.

SUMMARY OF THE INVENTION

It is an object of this invention to extend the range of a molecular drag type of pressure gauge to higher pressures.

It is a further object to extend the range of a molecular drag type gauge to lower pressures.

Another object of this invention is to provide extended range to both higher and lower pressures in a single molecular drag gauge.

It is also a feature of this invention to provide a mechanized pressure readout as a function of the drive voltage necessary to maintain a preset mechanical oscillator amplitude.

This invention achieves the above objectives, and overcomes many of the shortcomings of the prior art devices which measure gas pressure by measuring the gas drag force on a moving body, by utilizing a micromachined mass and spring system that is damped in proportion to the pressure of the gas which surrounds it. The mass motion is electrostatically excited and sensed, with the measured pressure range being extended by using a spring system comprised of a material having a very low internal damping, such as silicon, preferably single crystal silicon. The measurement range is extended at the low pressure end by the use of what is referred to herein as "squeeze damping", which is a special case of molecular damping, to increase the amount of vibrational damping to measurable levels. The measurement range is likewise extended to higher pressures by using micromechanical technology to minimize the distance between the vibrating member and a stationary member, and thereby extend the damping measurement within the molecular drag regime to higher pressures. The transition region between this molecular damping and higher pressure viscous damping is called slip damping and extends over approximately 2 orders of magnitude of pressure. The drag in the slip damping regime is not as pressure dependent as molecular drag, but it is still useful as a pressure indicator. Viscous damping is not pressure dependent. The practical range for measuring molecular drag, and therefore pressure, for a single sensor having a spring system comprised of a material with an intrinsic Q of well over 100,000 is between about 4 and 5 orders of magnitude. This difficulty is overcome with the pressure gauge of the present invention by either using more than one sensor, or by designing a single sensor to operate in two vibrational modes, one mode to make use of squeeze damping and the other to operate in the molecular drag and slip damping regimes. An electronic system is provided that measures the drive voltage necessary to maintain a predetermined oscillation amplitude of the vibrating member. This voltage, which is proportional to the damping of the vibrating member and thus pressure, is converted by the system to a pressure reading.

BRIEF DESCRIPTION OF THE DRAWINGS

FIG. 2b is an elevational view of the cantilever beam pressure sensor shown in FIG. 2a.

FIG. 3b is an elevational view of the sensor in FIG. 3a.

FIG. 4b is a elevational view of the sensor in FIG. 4a.

FIG. 5b is an elevational view of the sensor shown in FIG. 5a.

DESCRIPTION OF THE PREFERRED EMBODIMENTS

The design and operation of the present invention is based on the pressure dependent gas drag on a moving body, or damping effect, when the gas is in the molecular drag regime, referred to herein as molecular damping. The invention provides the means for extending the overall range of pressure measurement of this type of gauge by extending the molecular drag measurement range to pressures higher than those attainable with conventional drag dependent pressure sensors, and by providing a greatly increased drag or damping effect at lower pressures.

Figure 1:
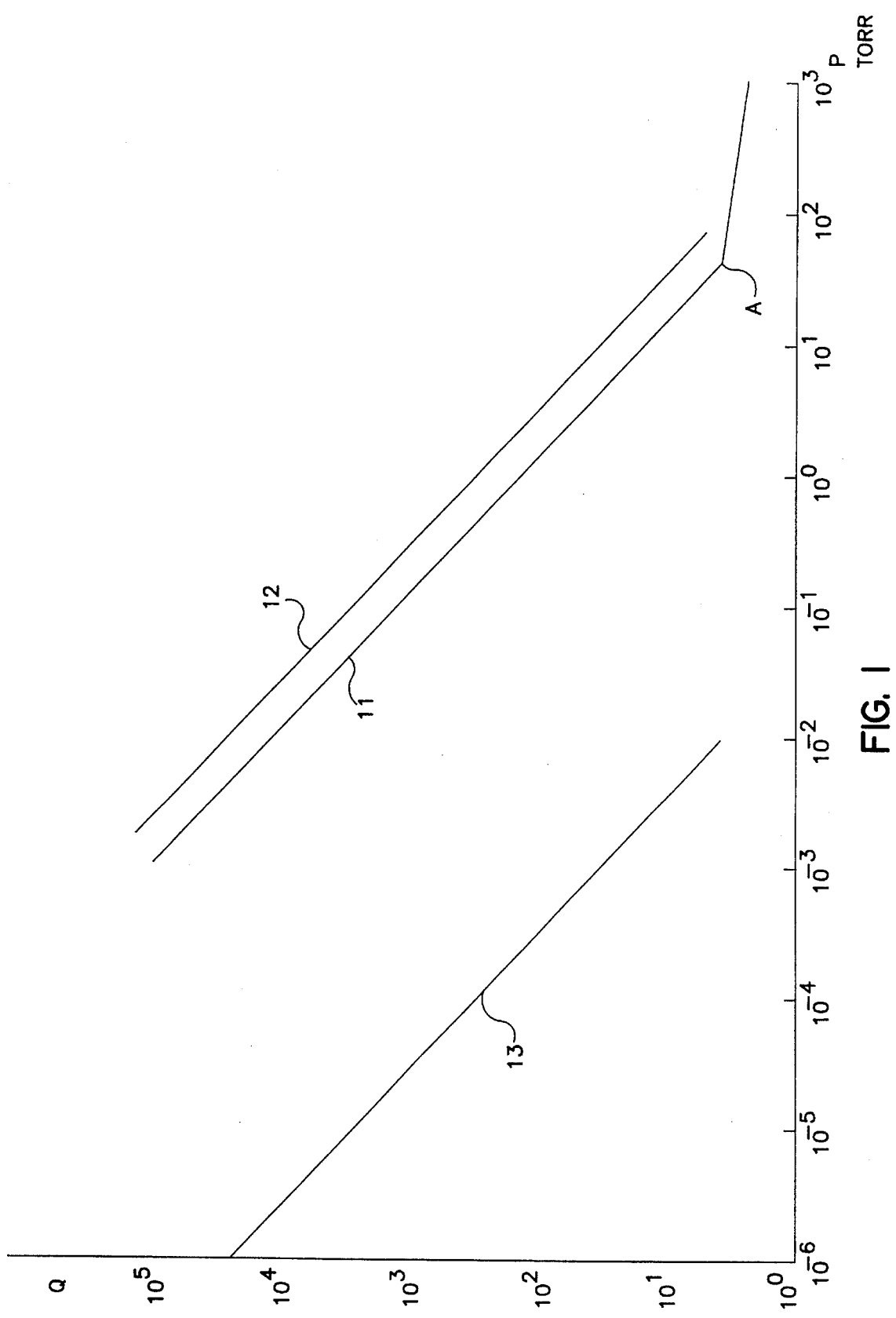
FIG. 1 is a plot showing the relationship of both the quality factor Q and the drive voltage for constant amplitude as a function of pressure for sensors of various designs.

It is well known that the drag force produced on a moving body in a gas is proportional to the gas pressure when the pressure is within in the molecular flow regime. One way of defining the molecular flow regime is that it occurs when the gas molecules are more likely to hit the walls of the chamber in which they are contained than they are to hit each other. In terms of the gas mean free path, if it is larger than the chamber dimensions, then the gas is in the molecular regime. It is recognized by those skilled in the art that the molecular flow regime can be extended to higher pressures by making the containment vessel smaller. However, the gas does not have to be in a closed container at all. The same effect of extending the molecular flow regime occurs for a gas if a stationary member is within 1 mean free path or closer to a moving member. Therefore, the one-for-one damping dependance of gas drag on a moving object in a given gas environment can be extended to higher pressures by reducing the distance between the moving member and a stationary member. Micromechanical technology provides the economical means to produce the desired small clearance between a moving, or vibratory member and a stationary member of a pressure sensor of the present invention. Plot 11 in FIG. 1 shows the variation in the quality factor Q, the measure of damping for an oscillator, with pressure for a micromechanical system of the present invention, having a nominal 2 micron clearance between a vibrating mass element, and stationary substrate element, both of which will be described in detail below. Those skilled in the art will appreciate that a 2 micron mean free path occurs at a pressure of about 40 Torr in air. An actual measurement of a micromechanical system of the present invention indicates that the linear relationship between Q and pressure is extends to approximately 50 Torr. At pressures above 50 Torr the sensor characterized in plot 11 in FIG. 1 continues to indicate a measured change in Q with pressure, but at a slower rate. This is the transition region, starting at point A, between molecular drag and viscous drag regimes and is called slip drag. At still higher pressures the measured Q will no longer change with pressure. This is the viscous drag regime.

A practical range for the measurement of Q for a pressure sensor of the present invention is about 5 to about 100,000. At higher Q values the signal levels become very small and therefore less accurate; or if the time decay method is used, the measurement times become very long. In addition, the intrinsic Q of a single crystal silicon spring system, which is preferred for use in the present invention as an oscillating means, can be neglected below 100,000, but starts to become an important factor at higher Q levels. For Q below 5 pressure measurement errors become significant because the effective Q differs from the measured Q, and the linear dependency between Q and drag breaks down. The practical limitations imposed on the Q range limits the pressure range that can be measured using a single mode sensor.

For measuring pressure at pressures below about $10^{-3}$ Torr, using the micromechanical system of the present invention, it is necessary to use a sensor with increased drag to keep the sensor Q within the previously described desired range. This is done by incorporating, what is referred to herein as "squeeze damping", into the design. The area of the vibrating mass plate is made large, and the clearance between the mass plate and a stationary substrate support member is kept small. The size of the mass plate and the clearance between the plate and the stationary support member will be dependent upon the pressure range for which the gauge is to be used. The larger the plate area and the smaller the clearance, the greater the drag force and the lower the achievable pressure measurement. Today a 20 mil diameter or square plate with a 1 micron spacing represents the state of micromachining art, but larger areas and closer clearances will undoubtedly become practical in the future. For measuring low pressures below $10^{-3}$ Torr, the mass plate is made to vibrate in a direction perpendicular to the stationary support member. The gas is alternatively pumped out of and into the volume between the vibrating mass plate member and the stationary support member, which greatly increases the drag on the mass and the resulting damping effect. This is the squeeze damping action. Squeeze damping allows pressure measurements to be extended to lower pressures without getting into the high Q range where measurements are difficult and the intrinsic Q of the oscillating means, such as a silicon spring system, has a significant effect.

Extension of the pressure measurement range of this gauge, beyond the 4 to 5 orders of magnitude limit dictated by the practical Q measurement range previously discussed, can be accomplished by using two or more sensors of the present invention, wherein the sensors are built on the same supporting substrate, such as Pyrex glass, dielectric coated silicon, or junction isolated silicon. For example, FIG. 1 shows curves for two such sensors, one designed for operation at higher pressures, on the order of about $10^{-3}$ Torr to about 10 Torr (plot 12), and one designed to operate at lower pressures, on the order of about $10^{-2}$ to less than about $10^{-6}$ Torr (plot 13). An alternative, and preferred embodiment for cost and space utilization purposes, utilizes a single sensor, where the mass vibrates in two modes, one parallel to the supporting substrate member and one perpendicular to it. The parallel motion can be optimized to measure in the upper half of the pressure range and the perpendicular mode can be optimized to operate in the lower half of the range.

Figure 2A:
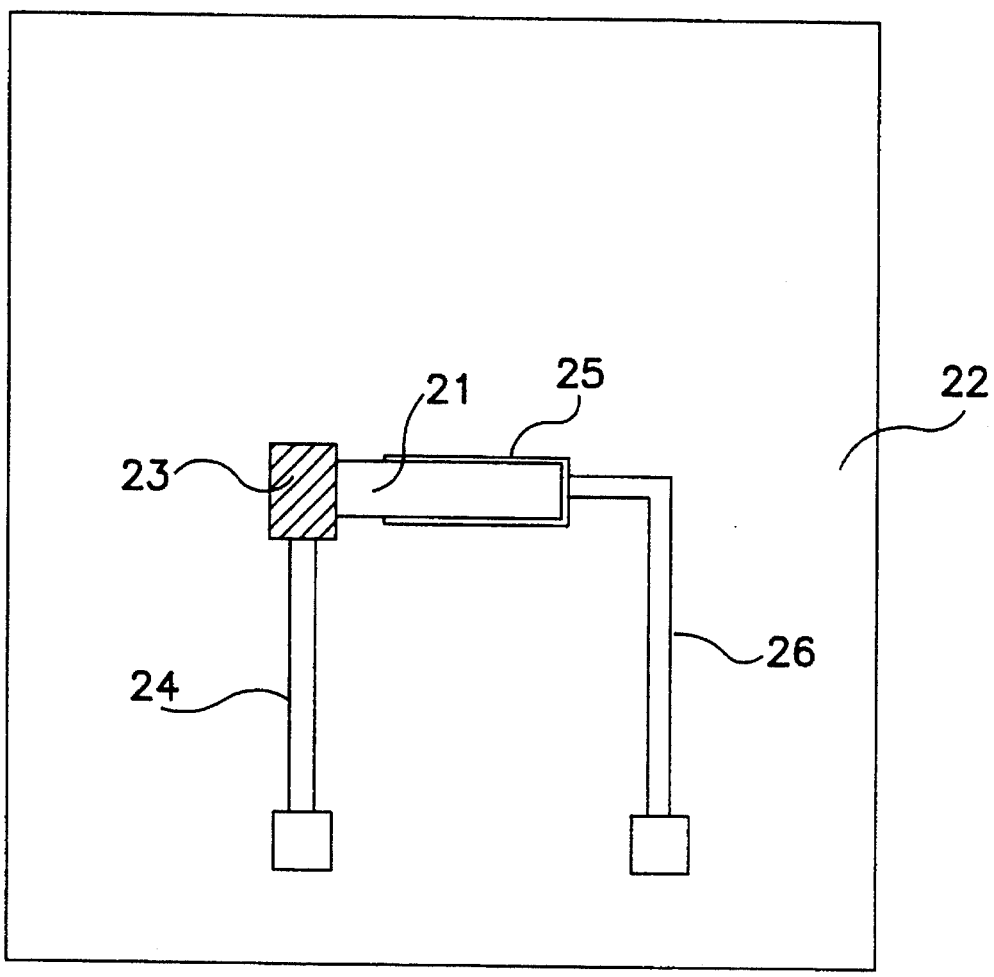
FIG. 2a is a plan view of a cantilever beam pressure sensor, which represents the simplest vibrating spring and mass system of this invention.
Figure 2B:
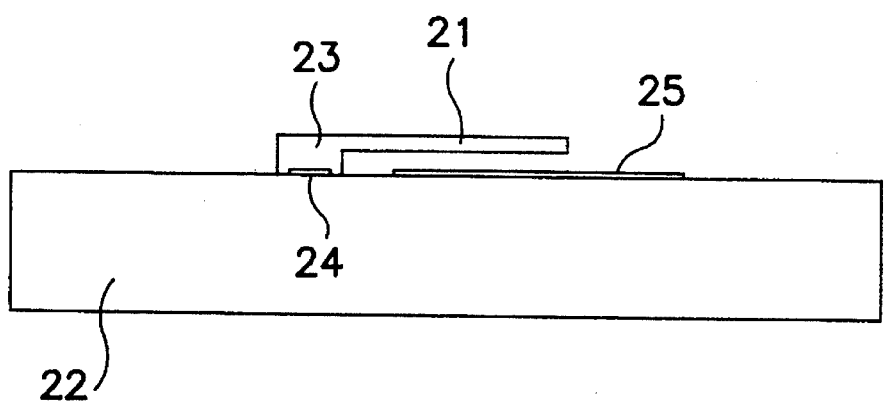

The mathematical basis for designing the embodiments of the pressure sensors of this invention starts with the equation of motion for a driven oscillator that is damped. Such an oscillator, used for the purpose of supporting the operational basis of the present invention, is shown in FIG. 2a and FIG. 2b. A cantilever beam 21 is supported by electrically insulative substrate 22, such as Pyrex, by anchor point 23. The cantilever beam acts as both mass and spring in this system, as well as the first drive electrode. It is made of doped silicon, which is electrically conductive, and is provided an electrical connection to the outside world through anchor point 23 and the conductive path provided by metallization 24. The second electrode 25 of the electrostatic drive is supported by substrate 22 and is connected to the outside world via metallization 26. The driving force for the oscillator is periodic and will be considered as sinusoidal. The damping force is provided by the gas surrounding the oscillating element. The equation of motion for this damped system can be written in the form:

$$m\ddot{x} = -kx - K\dot{x} + C \sin \omega t \quad (1)$$

where x is the displacement of the mass from its rest position. The displacement of the mass is resisted by the spring force, which is k times the displacement, and the drag force, K times the velocity. The oscillator is driven by the force, $C\sin\omega t$. For cases where the damping, K, is small compared to the spring constant, k, where the drive frequency is the same as the resonance frequency, and where the oscillator has run long enough to damp out the effect of the starting conditions, the forced motion is:

$$x = \frac{-C}{K\sqrt{\frac{k}{m}}} \cos \sqrt{\frac{k}{m}} \, t \quad (2)$$

and the amplitude of the motion is:

$$X = \frac{C}{K\sqrt{\frac{k}{m}}} \quad (3)$$

Various methods of applying the electrical forcing function can be used, such as piezoelectric, electromagnetic and electrostatic; however the electrostatic is preferred for its ease of fabrication. The electrostatic drive is achieved by applying a sinusoidal voltage between the conductive vibrating mass element, which for the system depicted in FIG. 2a is the cantilever beam 21, and an opposing electrode on the supporting member 22, which in FIG. 2a is the substrate electrode 25. The force on the mass is caused by the applied voltage acting on the charge that accumulates on the mass, which is acting as one plate of a capacitor. The capacitance of the capacitor is known to be $$c = \frac{A \epsilon_0}{d} \quad (4)$$

where A is the electrode area, or as used in the embodiments herein, the mass area, d is the mass distance from the support member electrode, and $\epsilon_0$ is the dielectric permativity of free space. For purposes of analysis the amplitude of the mass vibration is taken as small compared to the mass distance from the fixed member so that the mass distance can be considered a fixed distance, d. The driving force, DF, can then be written as the charge times the voltage divided by the distance.

$$DF = \frac{A\epsilon_0}{d} V\sin\omega t \, \frac{V\sin\omega t}{d} \quad (5)$$

$$DF = \frac{-A\epsilon_0 V^2}{2d^2} (\cos 2\omega t - 1) \quad (6)$$

For this analysis the DC component can be ignored and the $2\omega$ can be set equal to the resonance frequency, $\sqrt{k/m}$. Therefore, C in amplitude equation (3) is equivalent to $A\epsilon_0 V^2/2d^2$. The drive frequency is seen to be half the resonance frequency, and the amplitude is seen to be a function of the drive voltage squared rather than the preferred linear dependence on voltage. This possible complication in the readout electronics can be almost totally eliminated, however, by the application of a relatively large bias voltage $V_0$ to the sinusoidal drive voltage V. The squares of the 4 possible combinations of drive and bias voltages are shown to be as follows:

$$(V_0 + V\sin\omega t)^2 = V_0^2 + \frac{V^2}{2} + 2V_0V\sin\omega t - \frac{V^2}{2}\cos 2\omega t \quad (7)$$

$$(V_0 - V\sin\omega t)^2 = V_0^2 + \frac{V^2}{2} - 2V_0V\sin\omega t - \frac{V^2}{2}\cos 2\omega t \quad (8)$$

$$(-V_0 + V\sin\omega t)^2 = V_0^2 + \frac{V^2}{2} - 2V_0V\sin\omega t - \frac{V^2}{2}\cos 2\omega t \quad (9)$$

$$(-V_0 - V\sin\omega t)^2 = V_0^2 + \frac{V^2}{2} + 2V_0V\sin\omega t - \frac{V^2}{2}\cos 2\omega t \quad (10)$$

Figure 3A:
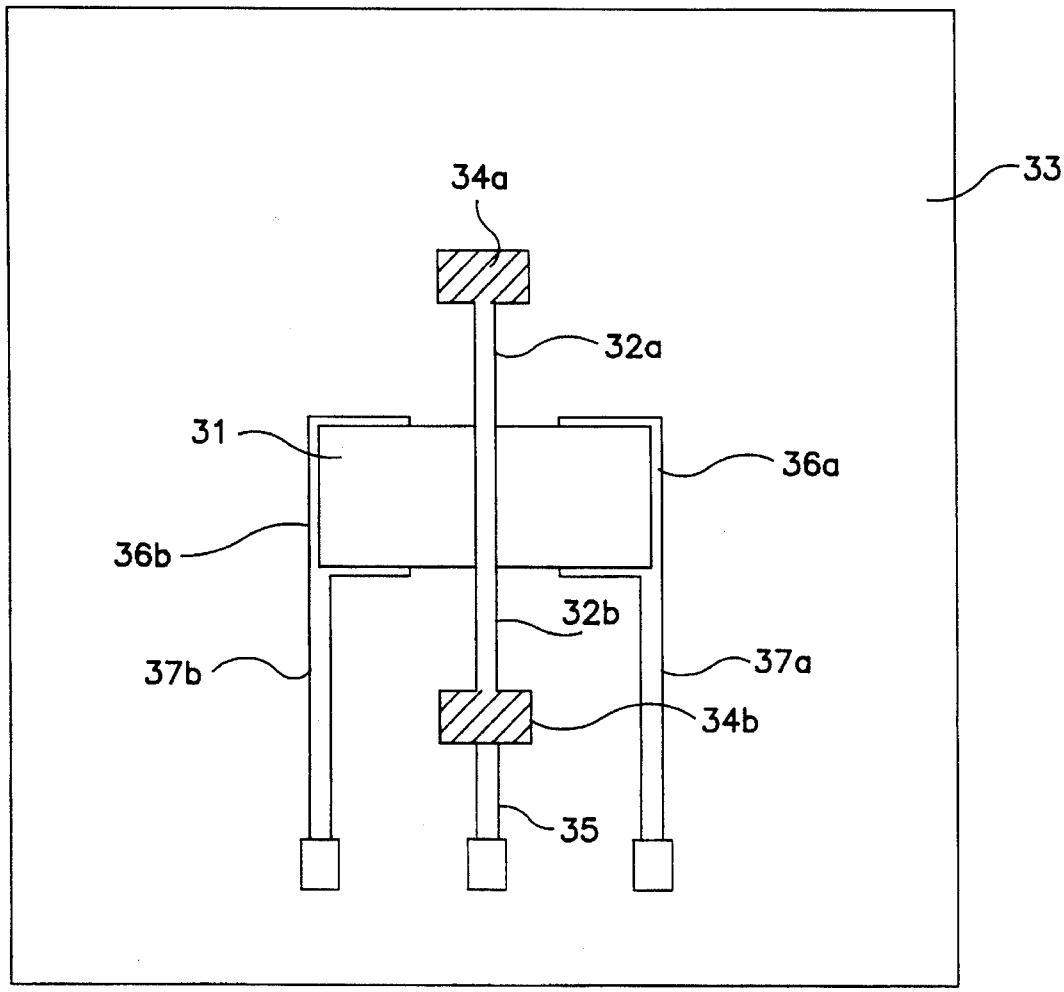
FIG. 3a is a plan view of a seesaw pressure sensor configuration of the present invention that can be driven by two drive voltages of equal amplitude, but 180 degrees out of phase.
Figure 3B:
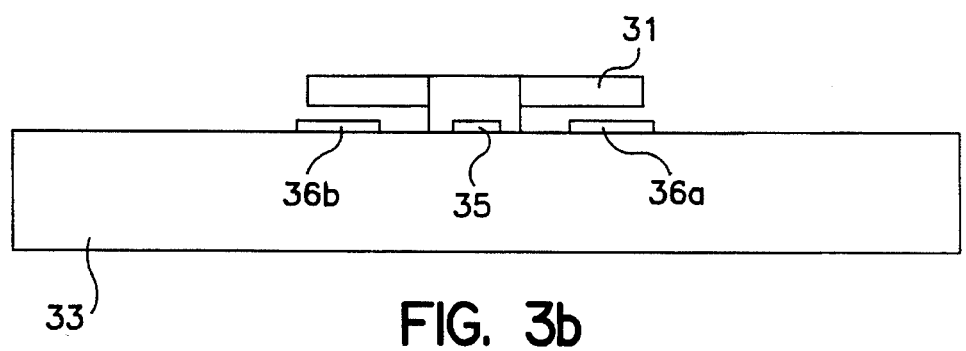

The $V_0V$ term dominates as long as $V_0 \gg V$. As alternative embodiment that avoids adding a large bias voltage $V_0$ to minimize the $2\omega$ term, uses two biased drive voltages, in combination and 180 degrees out of phase, to totally cancel the effect of this unwanted AC term. An example of such an embodiment is a seesaw structure as depicted in FIG. 3. If $(V_0+V\sin\omega\, t)$ were used to drive a support electrode under one side of a torsion-spring mounted seesaw mass, and $(V_0-V\sin\omega\, t)$ were used to drive a support electrode on other side, the effects of the $(V^2/2) \cos 2\omega t$ terms and the voltage bias terms $V_0$ will be cancelled. FIG. 3a and FIG. 3b show a seesaw mass 31 supported by torsion springs 32a and 32b which are in turn attached to substrate 33 by anchor points 34a and 34b. Mass 31 also acts as one of the drive electrodes and is electrically connected to the outside world through metallization 35. Two substrate drive electrodes, 36a and 36b, are connected to the outside world via substrate metallizations 37a and 37b. Cancellation of the effect of the $2\omega$ term can alternatively be achieved by suspending two identical planar masses symmetrically by a common spring system, which is driven with the same complementary drive voltages as described herein for the seesaw configuration. The cancellation of the unwanted AC term can also be realized by using the same combination of drive voltages previously described on two comb drives, positioned on opposite sides of an oscillating mass, to drive the mass parallel to the support member. Such an embodiment is shown in FIG. 5. The driving force would then be:

$$DF = C\sin\omega t = \frac{A\epsilon_0 V_0 V}{d^2} \sin\omega t \quad (11)$$

In this equation A refers to an equivalent area of the comb. For the desired resonance operation ω is set to $$\sqrt{k/m}.$$

There are three damping regimes that are useful for the pressure gauge of this invention; molecular damping at intermediate pressures, squeeze damping (an enhanced type of molecular damping) at low pressures, and slip damping at higher pressures. The pressure ranges for these damping regimes will vary depending on the specific operational parameters required, which in turn will dictate the sensor design specifications. For example, in a multisensor gauge the low pressure sensor would utilize a large mass plate, on the order of 20 mils across its smallest area dimension, spaced 2 microns or less from the support member. To take advantage of the squeeze damping effect the mass plate will vibrate in a direction perpendicular to its support plane. The high pressure sensor could use a mass of similar dimensions, also spaced 2 microns or less from the support substrate, however the direction of oscillation would be driven parallel to the support plane. If operational restrictions require the high pressure sensor to oscillate in a perpendicular direction, a ventilated mass plate could be used to prevent the squeeze damping effect. The webs between the holes in the mass plate should be no wider than the mass to substrate distance for a maximum reduction in the squeeze damping phenomenon. A pressure gauge having sensors of the type described herein could operate in the squeeze damping regime, for the low pressure sensor, between about $10^{-6}$ Torr and about $10^{-2}$ Torr. For the high pressure sensor, operation in the non-squeeze/molecular damping regime is between about $10^{-3}$ Torr and about 10 Torr, and in the slip damping regime between about 10 Torr and about 1000 Torr. One skilled in the art will recognize, and it will be demonstrated in the analysis below, that these ranges can be moved up or down by providing: changes in the spacing between the vibrating member and the support member; variations in the vibrating member area; variations in the direction of oscillation of the vibrating member; and by changing the resonant frequency of the spring and mass system. Also, those skilled in the art will appreciate that the shape of the vibrating member, particularly with respect to the minimum dimension across the mass for a given shape (i.e. a rectangle) driven perpendicular to the support member, can also affect the system's range of operation. It is an object of this analysis to show how these design parameters can be manipulated to make individual pressure sensors, each capable of measuring a different pressure range, for use in combination within a single pressure gauge, to provide an overall extended measurement range capability.

The relation of the damping factor to pressure for the three regimes is described below:

The damping factor for molecular damping is given the subscript m and is $$K_m \sim P \sqrt{\frac{M}{T}} \; A \tag{12}$$

where P is the pressure, M is the mass of the gas molecule, T is the absolute temperature and A is the area on which the damping force acts. This relationship for molecular damping holds true regardless of the direction of oscillation. For example, a plate of planar shape could move parallel to its planar axis, perpendicular to its planar axis, or vibrate in a torsional fashion about any of the plate's axes. However, the damping effect can be changed for a plate mass that is oscillating in a direction perpendicular to its planar axis by placing a second plate, which can also act as the support structure, parallel to the oscillating plate and in close proximity to it. In this arrangement gas is alternately forced out from between the plates and then sucked back in by the motion of the oscillating plate. This pumping action is called "squeeze damping". The squeeze damping can be reduced by perforating the plate with holes, by increasing the spacing between the plate and the support structure, and by reducing the plate size. The squeeze damping will revert to conventional molecular damping if the motion of the oscillating plate is changed to a vibratory motion which is parallel to the plane of the plate mass.

The damping factor for squeeze damping is given the subscript sq and is $$K_{sq} \sim P \sqrt{\frac{M}{T}} \; A \left( C_s \frac{W^3}{d^3} \right) \tag{13}$$

where $C_s$ is a constant that depends on the shape of the mass, d is the distance between the plate mass and the support member, and W is a mass dimension, such as the edge length for a square mass, or a diameter for a round mass. The bracketed quantity can be driven to unity, which takes the sensor out of the squeeze damping regime, by decreasing W or increasing d.

Figure 4A:
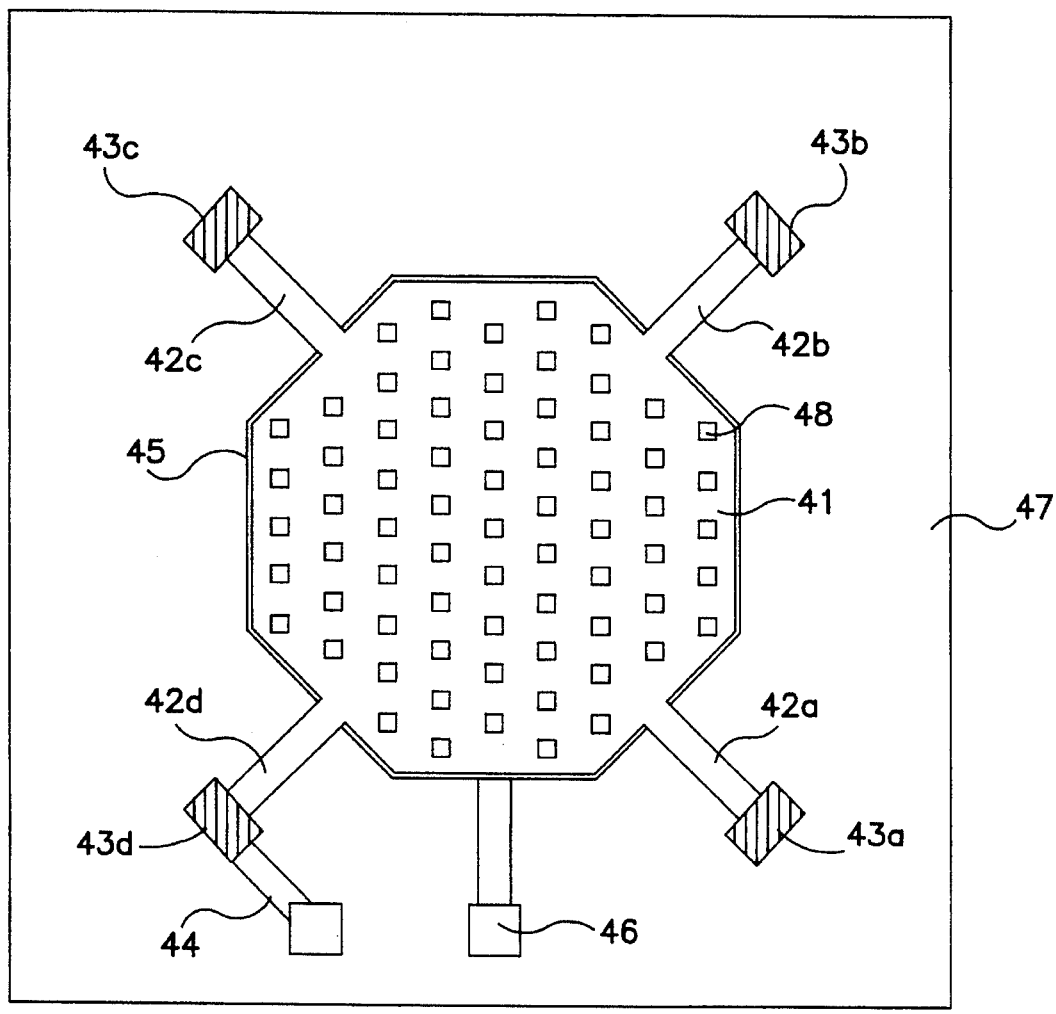
FIG. 4a is a plan view of a sensor with a large-area perforated mass supported by 4 springs.
Figure 4B:
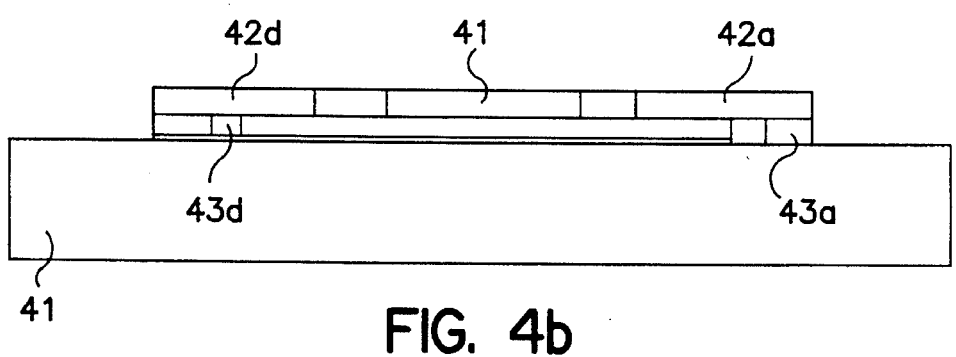

Referring to FIG. 4a and FIG. 4b, an embodiment of a single sensor designed in accordance with the present invention is shown, having large area mass 41 supported by 4 springs 42a, 42b, 42c, and 42d. A large area mass for present micromechanical technology is on the order of 20 mils ( approximately 500 microns) across for a mass-to-fixed-member spacing of about 1 or 2 microns. This limit results from a tendency for the plates to curl when larger mass areas are manufactured, which increases the likelihood of contact between the mass and substrate during operation. The springs are anchored to substrate 47 at anchor points 43a, 43b, 43c, and 43d. Mass 41 serves as one of the drive electrodes and is electrically connected to the outside world via spring 42d, anchor point 43d, and substrate metallization 44. Substrate electrode 45 is connected to the outside world via substrate metallization 46. Holes 48 in the mass may be incorporated to greatly reduce the squeeze damping effect depending on the operational requirements of the sensor. If squeeze damping is to be largely eliminated then the webs between the holes must be smaller than the mass-to- substrate distance. On the other hand fabrication methods that do not require holes must be employed to achieve the most effective squeeze damping.

The damping factor for slip damping is less dependant on pressure than molecular damping, and occurs over approximately 2 decades of pressure that transitions between molecular damping and viscous damping, where viscous damping has no dependance on pressure. Slip damping on sensors of the type described herein has been found to have the following dependance on pressure:

$$K_{sl} \sim P^n \sqrt{\frac{M}{T}} \; A \tag{14}$$

where n is on the order of ¼.

The vibration amplitude can now be written in terms of the oscillator design parameters for the three damping regimes. Operating on equation (3) for amplitude by substituting for C as given in equation (11), and for $K_m$ as given for molecular damping in equation (12) gives:

$$X_m \approx \frac{\epsilon_o V_o}{d^2 \sqrt{\frac{M}{T}} \sqrt{\frac{k}{m}}} \left(\frac{V}{P}\right) \quad (15)$$

In order to make the sensor operate in the molecular damping regime to as high a pressure as possible, d, the distance between the mass and stationary support member as previously described, must be made as small as possible. Present micromachining technology limits this to the order of 1 micron. Also, it is desirable to drive the constant amplitude at the higher pressures without employing excessive bias, $V_0$, and drive voltage, V. Those skilled in the art will recognize that the bias voltage will always be limited since its effect is to draw the vibrating member closer to the stationary member. If the bias voltage is too high, the electrostatic force will overcome the spring force and the vibrating member will "snap down" to the stationary member. The resonant frequency, $$\sqrt{k/m},$$

must be kept low, but not low enough to cause the sensor to be effected by external vibrations. Twenty thousand Hertz is a conservative choice for avoiding the effects of external vibration. In addition, it was assumed in deriving equation (15) that the sensor used for measuring at higher pressures was designed to avoid squeeze damping. This means that the sensor must be designed to have its mass move parallel to the fixed support member, or if the mass is designed to move perpendicular to the fixed member, its width must either be on the order of its spacing from the fixed member, or if the mass width is larger than the fixed member spacing, the mass must contain many closely spaced holes to prevent the squeeze damping effect.

For the low pressure sensor design equation (3) is written in terms of equation (11) for C and equation (13) for $K_{sq}$ $$X_{SQ} \sim \frac{d\epsilon_o V_o}{W^3 C_S \sqrt{\frac{M}{T}} \sqrt{\frac{k}{m}}} \left(\frac{V}{P}\right) \quad (16)$$

At low pressures it is important to keep the vibrational amplitude of the plate mass from becoming too large to prevent contact between the vibrating member and the stationary member. Equation (16) shows that the amplitude is reduced concurrently with a reduction in the distance d between the mass and the fixed support member. Furthermore, maximizing the plate mass edge dimension W greatly reduces the vibrational amplitude. In addition, maintaining the resonant frequency, $$\sqrt{k/m},$$

as high as allowable by the system readout electronics will also keep the vibrational amplitude within bounds at low pressures.

Figure 5A:
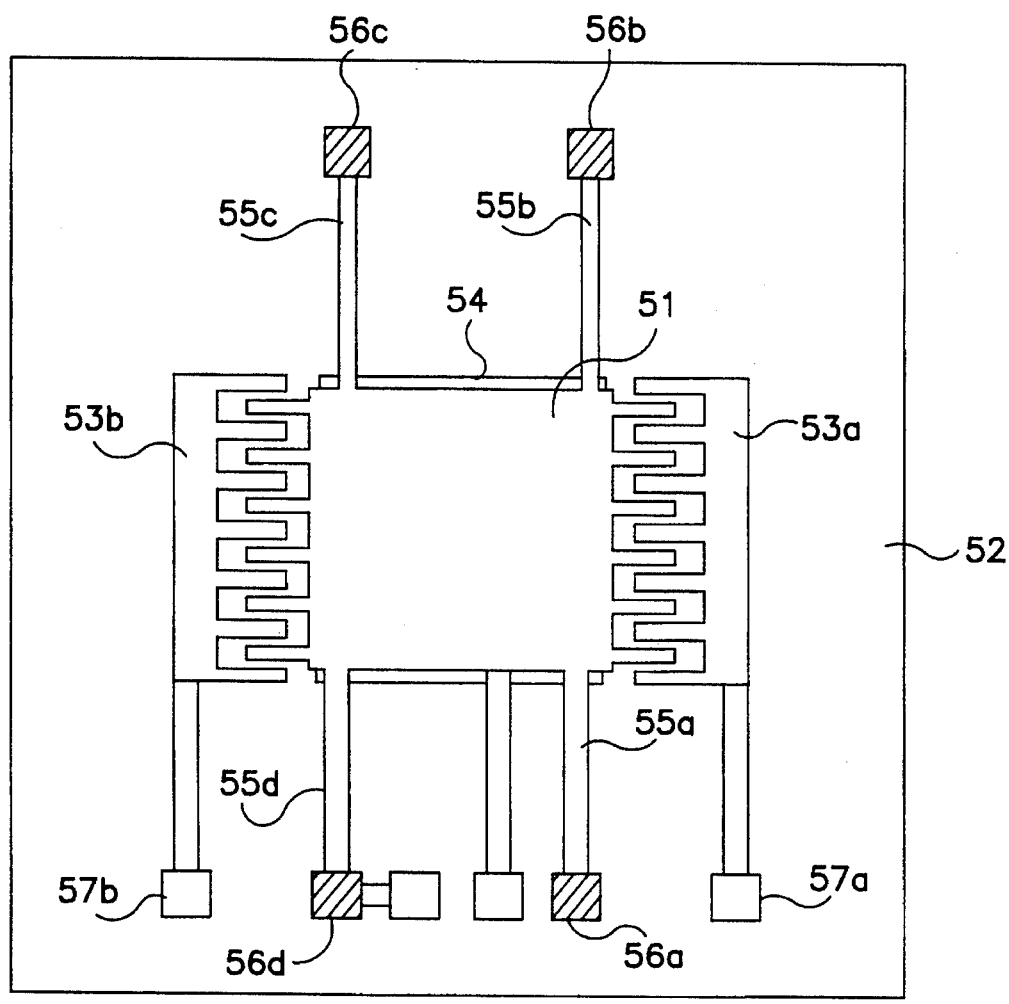
FIG. 5a is a plan view of an alternative embodiment of the sensor of the present invention where the mass can be driven in two modes, one mode parallel to a support member, for measuring pressures in the intermediate to high range, and one mode perpendicular to the support member, for measuring pressures in the intermediate to low range.
Figure 5B:
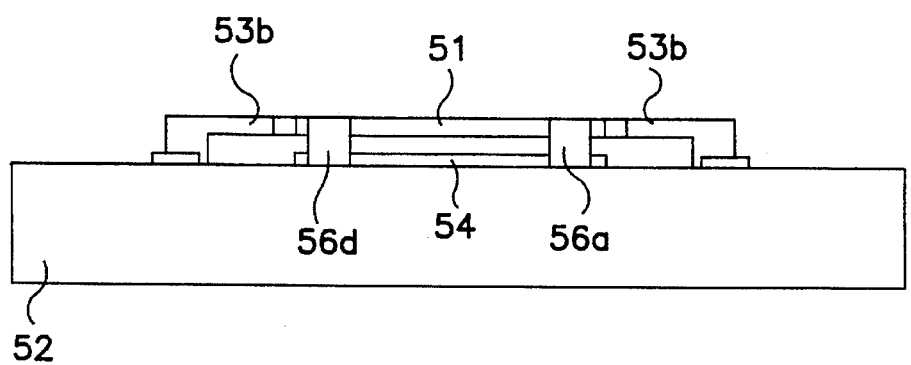

FIG. 5a and FIG. 5b show another alternative embodiment of the present invention, wherein the sensor is designed to operate in two vibration modes, one mode for measuring pressures at the low end of the pressure range, and another mode for measuring at the higher end of the pressure range. The high end pressure sensor can also be used to measure pressures which fall within the slip regime, and thereby extend the overall measurement range to still higher pressures, albeit with lower accuracy. Mass 51 is driven parallel to fixed support substrate 52 by comb electrodes 53a and 53b for higher pressure measurements. Mass 51 is driven to oscillate in a direction perpendicular to the substrate by substrate electrode 54 for lower pressure measurements. For the arrangement shown, the comb drive would use complementary AC drive voltages on the opposing comb drives, as previously described, but it is also possible to drive the mass with a single AC voltage on 1 comb drive. As shown in the figures, the squeeze mode is driven with a single AC voltage, however, those skilled in the art will recognize that it is possible to build a two mass system, each mass with dual comb drives, where both vibrational modes can be driven with a complementary AC drive. The frequencies of the two modes can designed to be different by making springs 55a, 55b, 55c, and 55d rectangular in cross section, and the frequencies can be adjusted, either up or down, by varying the cross section and length of the springs. The springs can alternatively be folded, so that anchor points 56a, 56b, 56c, and 56d are closer together, thereby reducing the differential thermal expansion effects between the substrate and spring mass system. This is useful when the sensor is to be used over a wide temperature range, where temperature control of the sensor might otherwise be called for. The spring system of the present invention should preferably be constructed of a material that is easily micromachined, has very low internal damping, and has essentially an infinite life at the displacements contemplated. It is also advantageous if, in addition to the above properties, the spring material is electrically conductive. The preferred material for making the spring and mass system is silicon, and in particular single crystal silicon that has been doped with a material to make it conductive, such as boron. Other materials such as quartz, sapphire and nickel can be used, but do not offer the above described properties in as beneficial a combination as silicon. The substrate, or fixed support member, must be an electrical insulator, or have an insulative surface, and must have a thermal coefficient of expansion close to that of the mass and spring material. Pyrex glass and passivated silicon are preferred materials, however other glass materials and ceramics could also be used for the substrate. The drive electrodes are connected to outside, power sources via substrate metallizations 57a, 57b, 58 and 59.

Device bias voltages up to 5 volts, and drive voltages in the range of 50 microvolt to 5 volts, are sufficient to drive the sensor system of the present invention. Drive voltages below 50 microvolts would result in noise and distortion problems, and drive voltages much higher than 5 volts would require higher voltage electronic components. The bias voltage, $V_0$, could also be varied to extend the drive force range beyond the 5 orders of magnitude suggested by the drive voltage range. However, the practical Q range for the sensor is in the 5 to 100,000 range so a larger drive voltage range is not required.

The pressure sensor described herein has the following phase response characteristics. For frequencies below resonance the output amplitude is constant for a constant amplitude drive voltage, and the sensor output is in phase with the drive signal. At resonance, the sensor output is Q times the output amplitude below resonance and the output signal lags the drive voltage by 90 degrees. For frequencies just above resonance, the sensor output signal decreases at greater than −40 db/decade, and for frequencies considerably higher than resonance, the output signal decreases at precisely −40 dB/decade. Phase lag between the drive signal and sensor output increases to 180 degrees as the frequency is increased beyond resonance.

Three readout methods are described that make use of the pressure dependent damping term.

The Bode response method is based upon the relation $$Q=(f_{res}/\text{-3 dB Bw}),$$

where $f_{res}$ is the resonant frequency, and wherein a constant amplitude, variable frequency signal is applied to the sensors drive electrodes. Output from the sensor is amplified and applied to an amplitude detector. The frequency of the variable drive source is stepped in small increments from frequencies below sensor resonance to a frequency far enough above resonance to include the minus 3 dB point. The output amplitude is recorded for each frequency step, generating a plot of amplitude verses frequency. The quality factor, Q, is then determined by measuring the −3 dB bandwidth of the resonant amplitude peak, and dividing the bandwidth into the resonant frequency to get Q, which is inversely proportional to pressure.

For the amplitude decay method the relation $$Q=(\pi t_1[f_{res}]),$$

where $t_1$=the time for the amplitude to decay to 1/e of the initial amplitude. A voltage oscillator is applied to the drive electrodes, and the oscillator frequency is locked to the sensor resonance with a phase lock loop. Output from the sensor is applied to a precision full wave rectifier and low pass filter. Output from the low pass filter is a signal that tracks the sensor output amplitude envelope. An electronic switch interrupts the signal path connecting the oscillator to the drive electrodes. As the output of the sensor decays and the output of the low pass filter tracks this decay. The time for the amplitude to decay to 1/e of its original value is measured, and the quality factor, Q, is then $\pi$ times the decay time multiplied by the resonance frequency.

Figure 6:
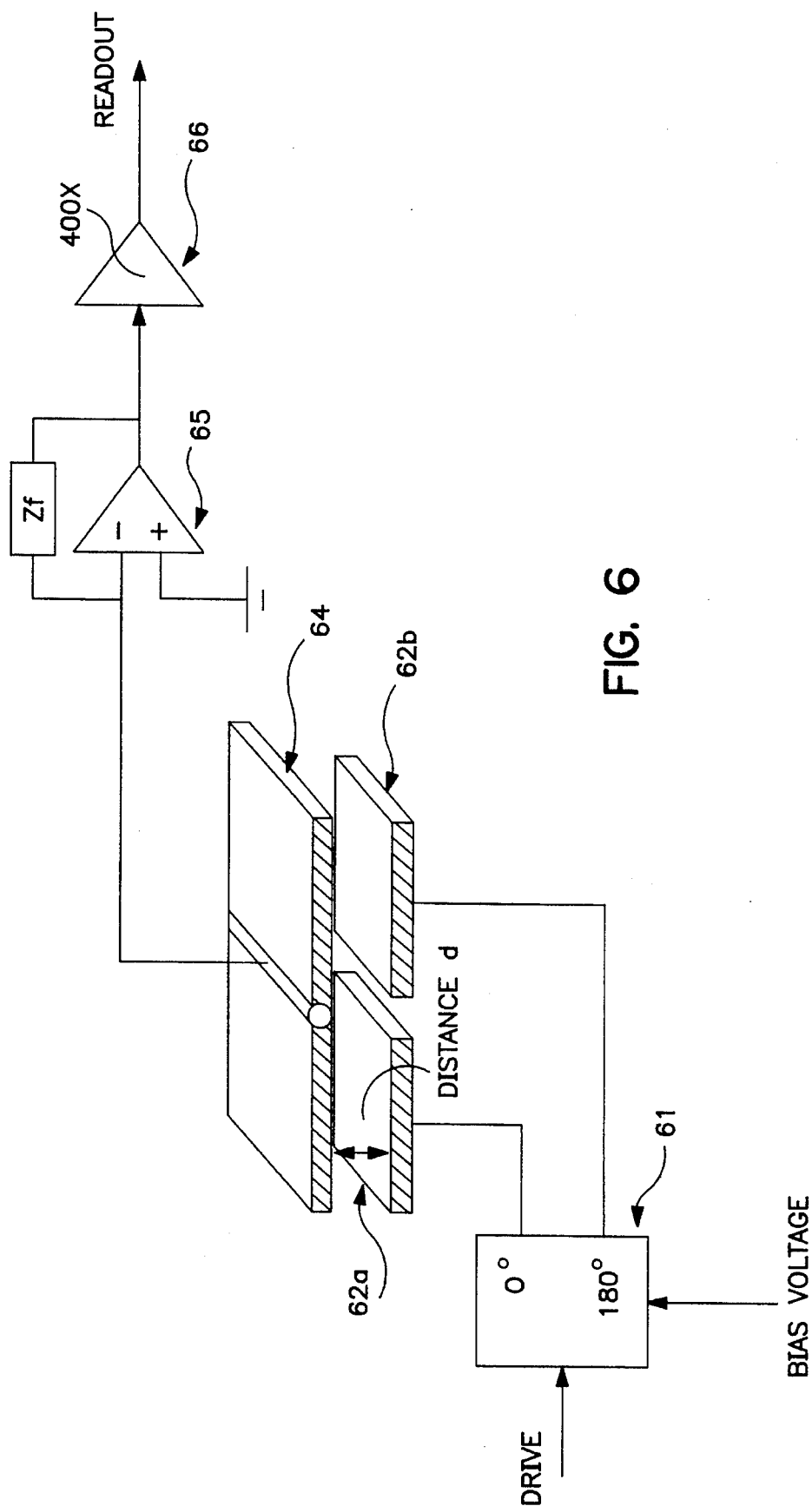
FIG. 6 is a schematic for the pressure sensor interface electronics of the present invention.

The constant amplitude method is based upon the relation:

$$Q=K[V_{out}@f_{res}/V_{DR}@f_{res}],$$

where $V_{out}$ is the output voltage, $V_{DR}$ is the drive voltage, and K is a constant. This method makes use of the relationship between the drive voltage and pressure as shown in equations (15) and (16) where for constant temperature and a fixed gas species the pressure is proportional to the drive voltage for a fixed amplitude. FIG. 6 shows a schematic for the pressure sensor interface electronics utilizing this method which is preferred, where the drive electrodes 62a and 62b are driven with phase splitter 61. The phase splitter provides in-phase signals and phase shifted signals 180 degree out of phase to the drive electrodes. In addition, a DC bias voltage is provided by the phase splitter sub circuit (not shown). The mass 64 is suspended by torsion spring 63, which allows motion of the mass in a seesaw mode about the torsion spring suspension. The mass is electrically connected to charge amplifier 65, which provides a virtual ground for the mass. Excitation from the drive electrodes causes the mass to vibrate around the torsion spring at its resonant frequency. This motion causes the sensor capacitance to vary in phase with the motion of the mass. Bias voltage applied between the mass and drive electrodes is constant, and causes charge to flow in and out of the charge amplifiers virtual ground as the mass vibrates. The oscillating virtual ground current results in a voltage signal at the output of the charge amplifier. The 400× voltage amplifier 66 provides additional gain for the pressure sensor signal.

Figure 7:
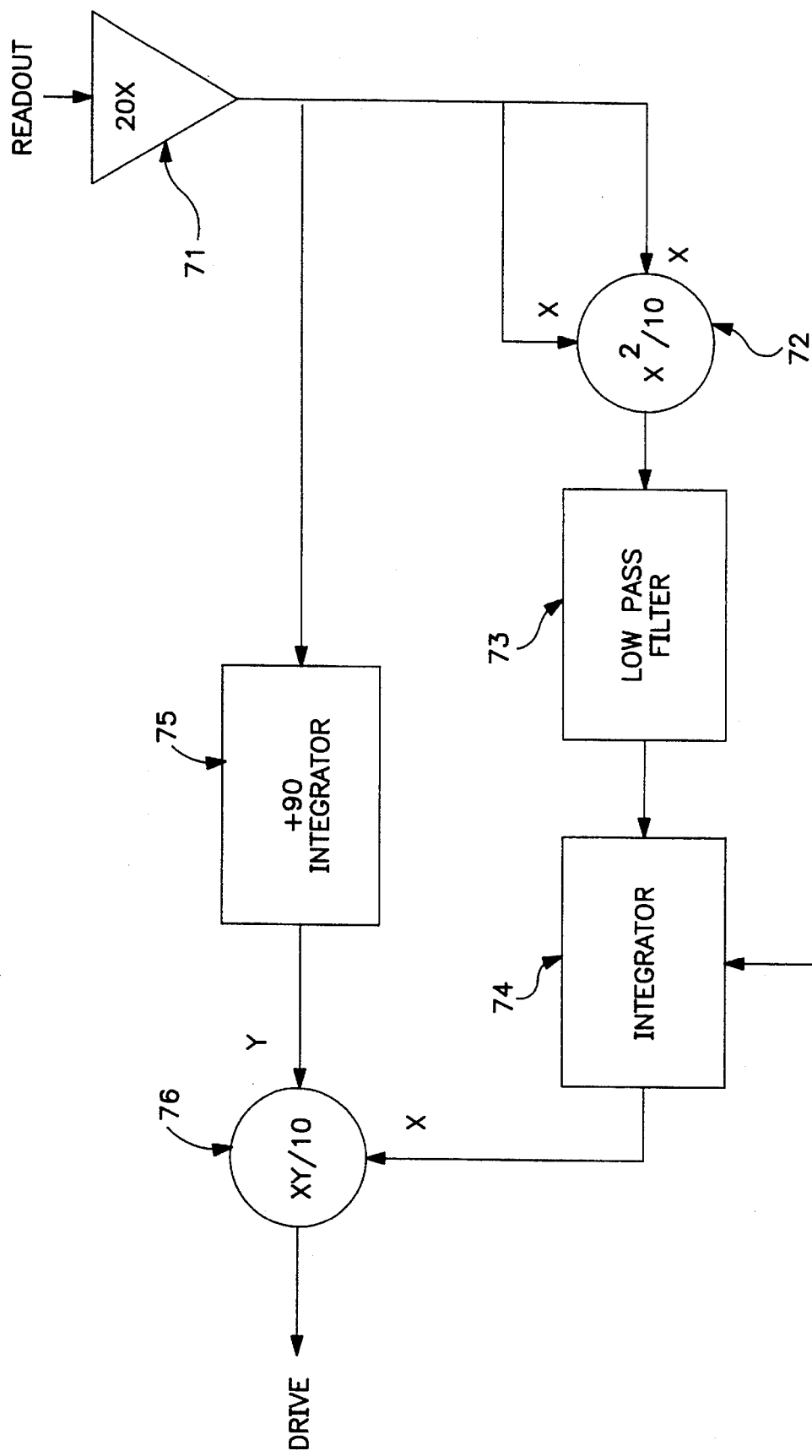
FIG. 7 is a schematic for the pressure sensor readout and drive electronics of the present invention.

FIG. 7 is a schematic for the readout and drive electronics where the readout from the sensor is amplified 71 to a 10 volt z-p signal level. This amplified signal is applied to analog multiplier ($X^2/10$) 72 and low pass filter 73. Output from the low pass filter is a voltage that is ½ the signal amplitude which is applied to the squaring circuit ($X^2/10$). The low pass output signal and a 5 volt set point voltage are applied to integrator 74. Any difference between the set point and the low pass filter is integrated thereby producing a control signal. The amplified 10 volt z-p sensor signal is also applied to an additional integrator 75 designed to shift the phase +90 degrees. This signal (+90 degree phase lead) now has the correct phase to excite the sensor. The control signal and the +90 degree phase shifted signal are applied to an additional multiplier 76 that modulates the amplitude of the +90 degree shifted signal. The constant amplitude method is preferred for the simplicity of the electronics and the readout speed.

All the electronic drive and readout methods described can be used for squeeze damped and molecular damped sensors and can be extended to the slip damped regime by recogniizing the change in the dependence of the quality factor on pressure in this regime.

The description set forth herein illustrates a few specific embodiments of the invention, and is not intended to limit the scope of the pressure range which may be achievable in the future with advancements in micromechanical technology as applied to the structure and method the present invention. Additional embodiments and advantages within the scope of the claimed invention will be apparent to one of ordinary skill in the art in view of such advancements.

What is claimed is:

1. A micromechanical pressure gauge comprising:
   a stationary member, said stationary member having a planar surface with a first conductive path and a first conductive electrode electrically coupled thereto;
   at least one vibrating member to act as a second conductive electrode and having a second conductive path, said vibrating member operably attached to said stationary member in proximity thereof and electrically coupled thereto, wherein a distance between said stationary and vibrating members is comparable to a mean free path of a molecule of a gas between said stationary and vibrating member;
   an electrical oscillator connected to said first and second conductive paths for inducing mechanical vibrations of a predetermined oscillation amplitude in said vibrating member, whereby said vibrating member operates in an extended molecular drag regime; and
   means for measuring a drive voltage required to maintain said predetermined oscillation amplitude in the presence of a pressure dependent damping of said vibrating member, said drive voltage being proportional to a total pressure of said gas.

2. The pressure gauge of claim 1, wherein said stationary member made of electrically insulative material.

3. The pressure gauge of claim 2, wherein said electrically insulative material is Pyrex glass.

4. The pressure gauge of claim 2, wherein said electrically insulative material is passivated silicon.

5. The pressure gauge of claim 3, wherein said vibrating member further comprises a mass and spring system, said system comprising an electrically conductive material.

6. The pressure gauge of claim 5, wherein said electrically conductive material is doped silicon.

7. The pressure gauge of claim 6, wherein said electrically conductive material is doped single crystal silicon.

8. The pressure gauge of claim 7, wherein said electrically conductive material is boron doped single crystal silicon.

9. The pressure gauge of claim 6, wherein the distance between said stationary member and the vibrating member has a value less than a mean free path of a molecule of said gas at a highest measured pressure.

10. The pressure gauge of claim 9, wherein for a vibrating member about 20 mils across at its narrowest dimension said distance is less than about 2 microns.

11. The pressure gauge of claim 10, wherein said vibrating member secured to said stationary member by at least one anchor point.

12. The pressure gauge of claim 6, wherein said vibrating member oscillates in a plane positioned parallel to said planar surface of said stationary member, the natural frequency of said oscillation in the range of about 20,000 Hz to about 100,000 Hz.

13. The pressure gauge of claim 6, wherein said vibrating member oscillates along a directional axis perpendicular to said planar surface, the natural frequency of said oscillation in the range of about 20,000 Hz to about 100,000 Hz.

14. A micromechanical pressure gauge comprising:

a stationary member, said stationary member made of an electrically insulative material and having at least one substrate electrode, each said electrode having a respective substrate conductive path coincident therewith and operably coupled thereto;

a plurality of vibrating members secured on said stationary member in proximity thereof, said vibrating members each having a mass, means for supporting said mass, a mass electrode coincident with the mass and operably coupled thereto, and a mass conductive path operably coupled to said mass electrode and electrically connecting said vibrating members to said stationary member wherein a distance between said stationary member and each vibrating member is comparable to a mean free path of a molecule of a gas residing between said stationary and each vibrating member;

an electrical oscillator connected to said conductive paths for inducing and maintaining mechanical vibrations of a predetermined oscillation amplitude in each said vibrating members in the presence of a pressure dependent damping, whereby said vibrating members each operate over a specified portion of an extended molecular drag regime; and means for measuring a drive voltage necessary for maintaining said predetermined mass oscillation amplitude, said drive voltage being proportional to a total pressure value of said gas.

15. The pressure gauge of claim 14, wherein the distance between said stationary member and each vibrating member is less than mean free path of a molecule of said gas at a highest measured pressure.

16. The pressure gauge of claim 15, wherein said distance between the stationary and vibrating member is between about 1 and 1/100 of a mean free path, and the measured pressure regime is thereby extended above the molecular drag regime into a slip drag regime by compensating for the changes in the drive voltage and the oscillation amplitude resulting from operations in said regime.

17. The pressure gauge of claim 15, wherein said vibrating members are comprised of silicon and the means for supporting said vibrating members is at least a pair of springs, said springs having a Q value greater than 100,000.

18. The pressure gauge of claim 17, wherein said silicon is a single crystal silicon.

19. The pressure gauge of claim 18, wherein said silicon is a boron doped single crystal silicon.

20. The pressure gauge of claim 17, wherein said springs are secured to said stationary member by at least one anchor point.

21. The pressure gauge of claim 20, wherein said springs are torsion springs and said vibrating members have masses diametrically opposed to each other and are secured to said stationary member in a seesaw configuration.

22. The pressure gauge of claim 20, wherein said springs operably couple said mass to the stationary member to facilitate oscillations in a direction perpendicular to said stationary member.

23. The pressure gauge of claim 20, wherein said springs operably couple said mass to the stationary member to facilitate oscillations in a direction parallel to said stationary member.

24. The pressure gauge of claim 23, wherein the substrate electrodes are positioned in alignment with the mass electrodes to generate the oscillations parallel to the stationary member.

25. The pressure gauge of claim 20, wherein said vibrating members are plates having a quadrilateral shape.

26. The pressure gauge of claim 20, wherein each vibrating member oscillates in a different vibrational mode.

27. The pressure gauge of claim 26, wherein the vibrational modes are oscillation directions parallel and perpendicular with respect to said stationary member.

28. The pressure gauge of claim 27, wherein said vibrating member mass is a plate having a quadrilateral shape with an edge length on the order of about 20 mils, and is spaced about 2 microns from said support member.

29. The pressure gauge of claim 27, wherein the pressure measurement is extended to higher pressures by incorporating a plurality of openings in a first vibrational member to allow the gas to pass therethrough, said openings being spaced apart on the order of about a distance less than a clearance distance between said vibrating and said support members.

30. The pressure gauge of claim 29, wherein the pressure measurement is extended to lower pressures by increasing the natural frequency of oscillation for a second vibrational member and decreasing the minimum distance between said vibrational member and said support structure.

31. A method of extending a range of measurements for micromechanical pressure gauge, comprising the steps of:

providing at least two vibrating members having an oscillation means made from a material having a high Q value secured to a stationary member with a minimum clearance between said vibrating members and said stationary member;

extending the measurement range to higher pressures in both a molecular drag and a slip drag regime by driving a first vibrating member to oscillate in a direction parallel to the stationary member and minimizing the resonant frequency of said vibrating member;

extending the measurement range to lower pressures by driving a second vibrating member to oscillate in a direction perpendicular to the stationary member and maximizing a minimum planar dimension of said vibrating member and minimizing the natural frequency of said member.

32. A method of extending a range of measurements for a micromechanical pressure gauge, comprising the steps of:

providing at least two vibrating members having an oscillation means made from a material having a high Q value secured to a stationary member, a clearance between said vibrating members and said stationary member being less than a mean free path of molecules of a gas between said vibrating and stationary member at a highest measured pressure, said highest pressure being within a molecular drag regime;

extending the measurement range to higher pressures by driving a first vibrating member, having a perforated surface, to oscillate in a direction perpendicular to the stationary member and minimizing the resonant frequency of said vibrating member;

extending the measurement range to lower pressures by driving a second vibrating member to oscillate in a direction perpendicular to the stationary member, minimizing said clearance distance between said vibrating and said support members, maximizing a minimum planar dimension of said vibrating member, and maximizing the resonant frequency of said vibrating member.

33. The method of extending the range of measurements of claim 31 or 32, wherein the low pressure measurement is in a range of about $10^{-6}$ Torr to about $10^{-2}$ Torr, and the high pressure measurement in a range of about $10^{-3}$ Torr to about 1000 Torr.

34. A method of extending a range of measurements for a micromechanical pressure gauge, comprising the steps of:

providing a vibrating member having planar dimensions which maximize the minimum dimension for a given member shape, and is secured to a stationary member with a minimized clearance, said vibrating member having a spring system of both low and high natural frequency that will allow oscillations of said member in directions both parallel and perpendicular respectively to said stationary member;

oscillating said vibrating member in a plane parallel to said stationary member for high pressure measurements; and oscillating said vibrating member in a plane perpendicular to said stationary member for low pressure measurements.

* * * * *